US007623195B2

(12) United States Patent
Park et al.

(10) Patent No.: US 7,623,195 B2
(45) Date of Patent: Nov. 24, 2009

(54) STRUCTURE FOR ASSEMBLING LAMP WIRES FOR BACKLIGHT ASSEMBLY INTO LIQUID CRYSTAL DISPLAY MODULE

(75) Inventors: Chul Park, Kyongsangbuk-do (KR); Se Chang Won, Kumi-shi (KR); Myong Gi Jang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1043 days.

(21) Appl. No.: 10/188,323

(22) Filed: Jul. 3, 2002

(65) Prior Publication Data

US 2003/0016312 A1 Jan. 23, 2003

(30) Foreign Application Priority Data

Jul. 11, 2001 (KR) ................. 2001-41667

(51) Int. Cl.
*G02F 1/1333* (2006.01)
(52) U.S. Cl. .............. 349/58; 349/61; 349/64; 349/65; 361/681
(58) Field of Classification Search ............. 349/58, 349/61, 64, 65; 361/681
See application file for complete search history.

(56) References Cited

U.S. PATENT DOCUMENTS

| 5,375,005 A | | 12/1994 | Komano | |
|---|---|---|---|---|
| 5,763,832 A | * | 6/1998 | Anselm | .......... 174/65 R |
| 6,231,202 B1 | * | 5/2001 | Kozaka et al. | .......... 362/31 |
| 6,441,874 B1 | * | 8/2002 | Saito et al. | .......... 349/70 |
| 6,501,642 B2 | * | 12/2002 | Kim | .......... 361/681 |
| 6,525,789 B1 | * | 2/2003 | Lee | .......... 349/58 |
| 6,649,836 B2 | * | 11/2003 | Brechbill et al. | .......... 174/60 |
| 6,667,779 B2 | * | 12/2003 | Lee | .......... 349/58 |
| 2001/0026336 A1 | * | 10/2001 | Yano | .......... 349/63 |
| 2001/0035923 A1 | * | 11/2001 | Cha et al. | .......... 349/65 |
| 2001/0050735 A1 | * | 12/2001 | Yajima et al. | .......... 349/65 |
| 2002/0130985 A1 | * | 9/2002 | Weindorf et al. | .......... 349/61 |
| 2002/0151208 A1 | * | 10/2002 | Aekins | .......... 439/418 |

FOREIGN PATENT DOCUMENTS

| DE | 692 16 330 T2 | 5/1997 |
|---|---|---|
| JP | 05-066390 | 3/1993 |
| JP | 2000-67625 | 3/2000 |
| JP | 2000-275635 | 10/2000 |
| KR | 1019990208028 | 4/1999 |
| KR | 102001053781 A | 7/2001 |

\* cited by examiner

*Primary Examiner*—Allyson N Trail
(74) *Attorney, Agent, or Firm*—McKenna Long & Aldridge (57) ABSTRACT

A structure for assembling lamp wires for a backlight into an LCD module is disclosed, in which the lamp wire for providing a power to a lamp is stably connected to the lamp. In the structure, a mold frame includes an opening formed at one portion slightly apart from one corner at a predetermined distance, for connecting and supporting wires connected to both ends of the lamp, the wires being folded or bent several times at different portions in the mold frame and being extracted to the outside of the LCD module through the opening. Meanwhile, an inserting recess is formed at the opening, and the wires connected together by the connector are inserted to the inserting recess.

7 Claims, 10 Drawing Sheets

STRUCTURE FOR ASSEMBLING LAMP WIRES FOR BACKLIGHT ASSEMBLY INTO LIQUID CRYSTAL DISPLAY MODULE

This application claims the benefit of the Korean Application No. 2001-41667 filed on Jul. 11, 2001, which is hereby incorporated by reference for all purposes as if fully set forth herein.

BACKGROUND OF THE INVENTION

1. Field of the Invention

The present invention relates to a backlight assembly of a liquid crystal display (LCD) module, and more particularly, to a structure for assembling lamp wires for a backlight into an LCD module to stably connect the lamp wires for providing power to a lamp, the lamp being used as the backlight of the LCD module.

2. Discussion of the Related Art

In general, a liquid crystal display (LCD), one type of flat display, provides an excellent visual perception as compared to a cathode-ray tube (CRT); consumes much less power than the CRT of the same size; and produces significantly less heat. Because of these features, in addition to plasma display panel (PDP) and field emission display (FED), the LCD has been drawing particular attention as a next generation display for cellular phones, computer monitors, and TV receivers.

A typical LCD is provided with two thin glass substrates having surfaces that have been specially treated and a liquid crystal injected between the two glass substrates. The liquid crystal is in a state between solid and liquid. The arrangement of the molecules of liquid crystal is changed according to a voltage difference between electrodes formed on the glass substrates. Changing the orientation of the liquid crystal molecules varies the light transmittance through the LCD panel so that varying degrees of brightness and darkness are generated on a display panel, thereby displaying an image. However, the LCD does not emit light by itself, so that a light source such as a lamp is additionally required to display the image on the LCD panel.

Generally, an LCD module is used for a display device of a portable or notebook computer. The LCD module includes a backlight assembly as a light source behind or along the LCD panel.

Figure 1:
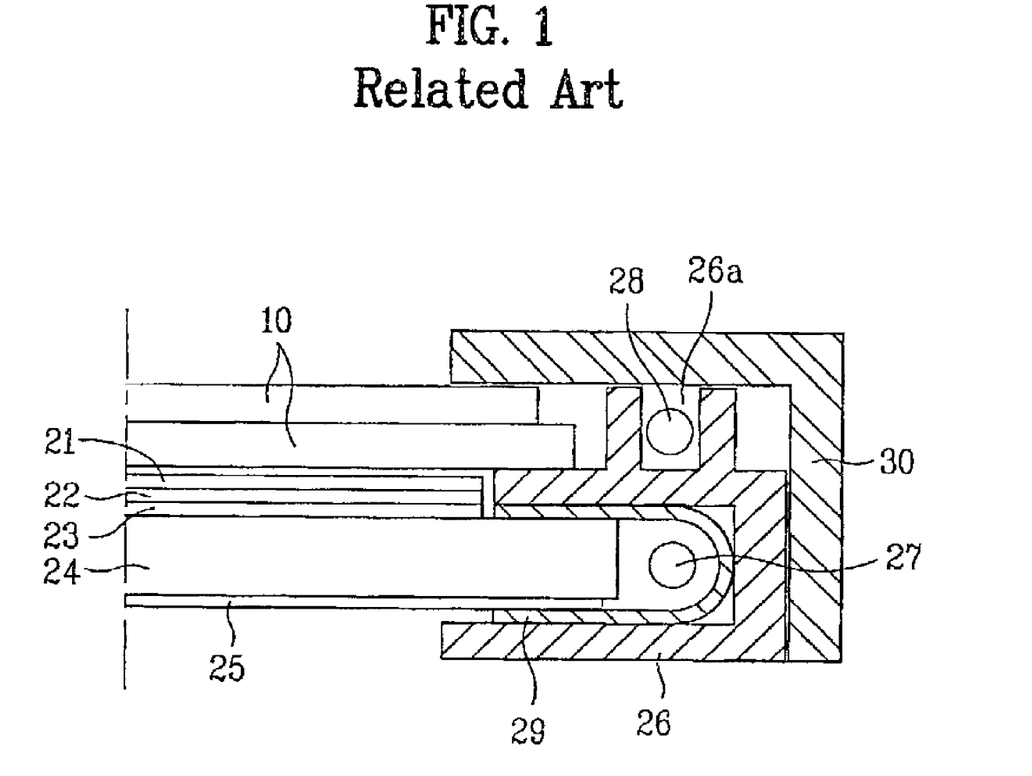
FIG. 1 is a sectional view showing one part of a related art LCD module for a portable computer.

As shown in FIG. 1, the backlight assembly of the LCD module includes a mold frame 26, a lamp 27, a metal reflecting plate 29, a light-guiding plate 24, a reflecting sheet 25, and a plurality of diffusion and prism sheets 21, 22 and 23.

The rectangular mold frame 26 is formed of synthetic resin, and the lamp 27 for emitting light is mounted at an inner side of the mold frame 26. Also, the metal reflecting plate 29 as a lamp housing surrounds one part of the lamp 27 at the inner side of the mold frame 26 to reflect light emitted from the lamp 27. The light-guiding plate 24 is mounted in parallel with the lamp 27 at the mold frame 26 to guide light emitted from the lamp 27 to an entire surface of the substrate. The reflecting sheet 25 is positioned under the light-guiding plate 24. The plurality of diffusion and prism sheets 21, 22 and 23 are positioned on the light-guiding plate 24.

Figure 2:
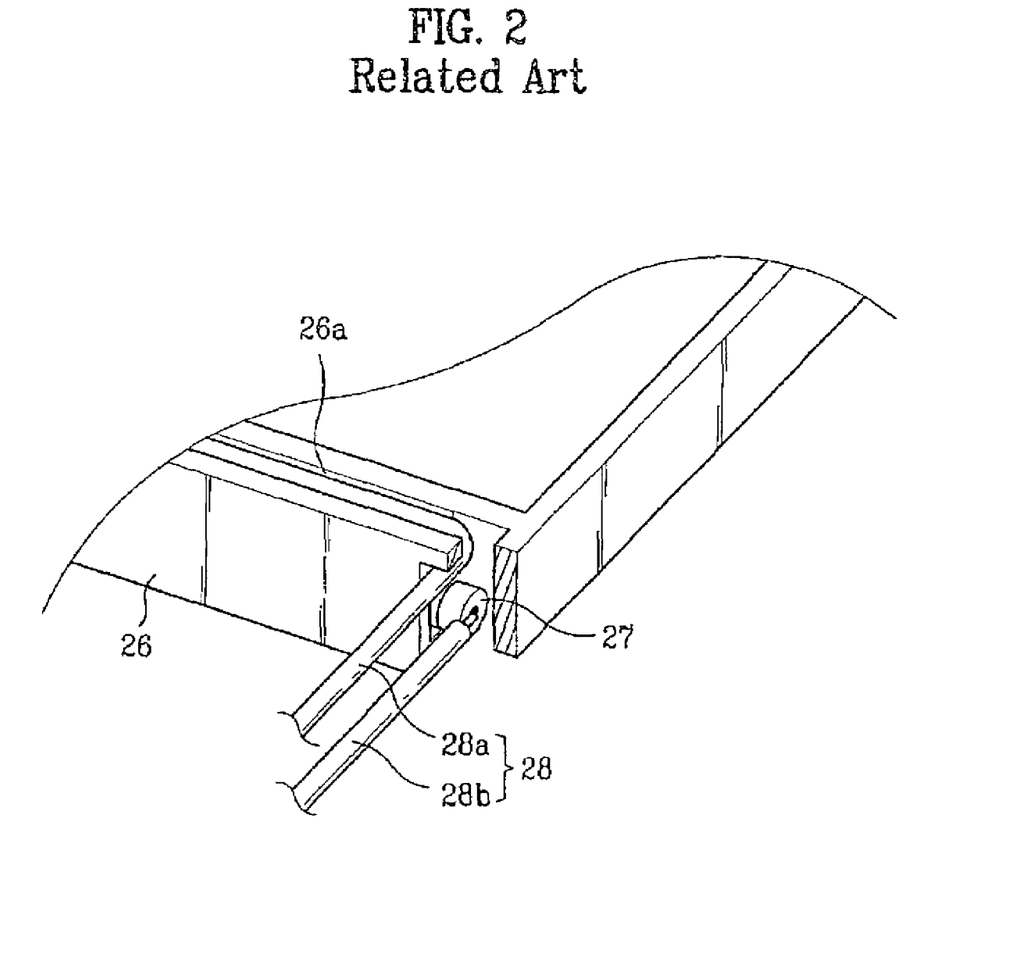
FIG. 2 is a perspective view illustrating one part of a related art LCD module to explain a connection structure of a related art lamp wire for the LCD module shown in FIG. 1.

As shown in FIG. 2, lamp wires 28a and 28b are respectively connected to both ends of the lamp 27 for electrically connecting the lamp to an external power source. At this time, the lamp wires 28 are extracted to the outside of the LCD module through an opening formed at one corner of the mold frame 26 and are connected to the external power source (not shown).

In the related art backlight assembly, the lamp wire 28a connected to one end of the lamp 27, which is apart from the opening, is guided along a receiving groove 26a formed at the edge of the mold frame 26, and is extracted to the outside of the LCD module through the opening. Meanwhile, the wire 28b connected the other end of the lamp 27, which is close to the opening, is directly extracted to the outside of the LCD module through the opening.

In use of such a related art LCD module, if tension is applied to the lamp wires 28, and such force is directly transmitted to a junction between the lamp 27 and the lamp wire 28b, the junction between the lamp 27 and the lamp wire 28b is disconnected, thereby disconnecting the power supply from the lamp 27. Furthermore, the end of the lamp 27, which is close to the opening, may be damaged.

In the method for fabricating the related art LCD module, the lamp wires 28 are formed in the mold frame 26, and the metal chassis is connected along the edge of the liquid crystal panel 10 and the mold frame 26 for a connection of the liquid crystal panel 10 to the backlight assembly. At this time, if any one of the wires comes out of the opening, the wires may be damaged due to the sharp edge of the metal chassis during connecting the metal chassis to the mold frame.

SUMMARY OF THE INVENTION

Accordingly, the present invention is directed to a structure for assembling lamp wires for a backlight assembly into an LCD module that substantially obviates one or more problems due to limitations and disadvantages of the related art.

An advantage of the present invention is to provide a structure for assembling lamp wires for a backlight assembly into an LCD module in which it is possible to prevent the lamp wires from being damaged and disconnected by improving the structure for assembling the lamp wires into the LCD module.

Another advantage of the present invention is to provide a structure for assembling lamp wires for a backlight assembly into an LCD module in which the lamp wires are connected at one portion by a connector, the connector being detachably connected with an opening of a mold frame, so that the lamp wires are stably mounted in the mold frame, thereby preventing the wires from being disconnected during fabricating the LCD module.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, in a structure for assembling lamp wires for a backlight assembly into an LCD module, the LCD module including a liquid crystal panel and a backlight assembly as a light source for emitting light to the liquid crystal panel at the rear of the liquid crystal panel, the backlight assembly including a plurality of diffusion and prism sheets, a light-guiding plate, a reflecting sheet, a rectangular mold frame supporting the elements, a lamp mounted at one corner of the mold frame and emitting light, and lamp wires connected to both ends of the lamp to provide external power to the lamp. The mold frame includes an opening formed at one portion slightly spaced from one corner of the mold frame by a predetermined distance, for inserting and supporting wires connected to both ends of the lamp, the wires being extracted to the outside of the LCD module through the opening in a state of that the wires are folded several times.

At this time, the lamp wires are respectively folded at two portions where the wire is extracted to the outside of the LCD module through the opening of the mold frame and is connected to the end of the lamp, so that support is generated in the folded portions of the wire. Even though tension may be transmitted to a junction of the lamp and wire, it is possible to prevent the wire from being disconnected.

In another aspect of the present invention, in a structure for assembling lamp wires for a backlight assembly into an LCD module, the LCD module including a liquid crystal panel, and a backlight assembly as a light source for emitting light to the liquid crystal panel, the backlight assembly including a plurality of diffusion and prism sheets, a light-guiding plate, a reflecting sheet, a rectangular mold frame for supporting the elements, a lamp mounted at an inner side of the mold frame for emitting light, and a lamp wire connected to both ends of the lamp to provide power, an inserting recess is formed at one corner of the mold frame, and the lamp wires are connected at one portion by a connector, the connector being detachably connected to the inserting recess, so that the connector is inserted to the inserting recess.

In another aspect of the present invention, the connector is inserted the inserting recess in a simple fit system.

In another aspect of the present invention, a projection is formed at the inserting recess of the mold frame, and a hook is formed in the connector, the hook being detachably connected to the projection.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to illustrated embodiments of the present invention, examples of which are illustrated in the accompanying drawings. Wherever possible, the same reference numbers will be used throughout the drawings to refer to the same or like parts.

A structure for assembling lamp wires for a backlight assembly into an LCD module according to the present invention will be explained with reference to the accompanying drawings.

Figure 3:
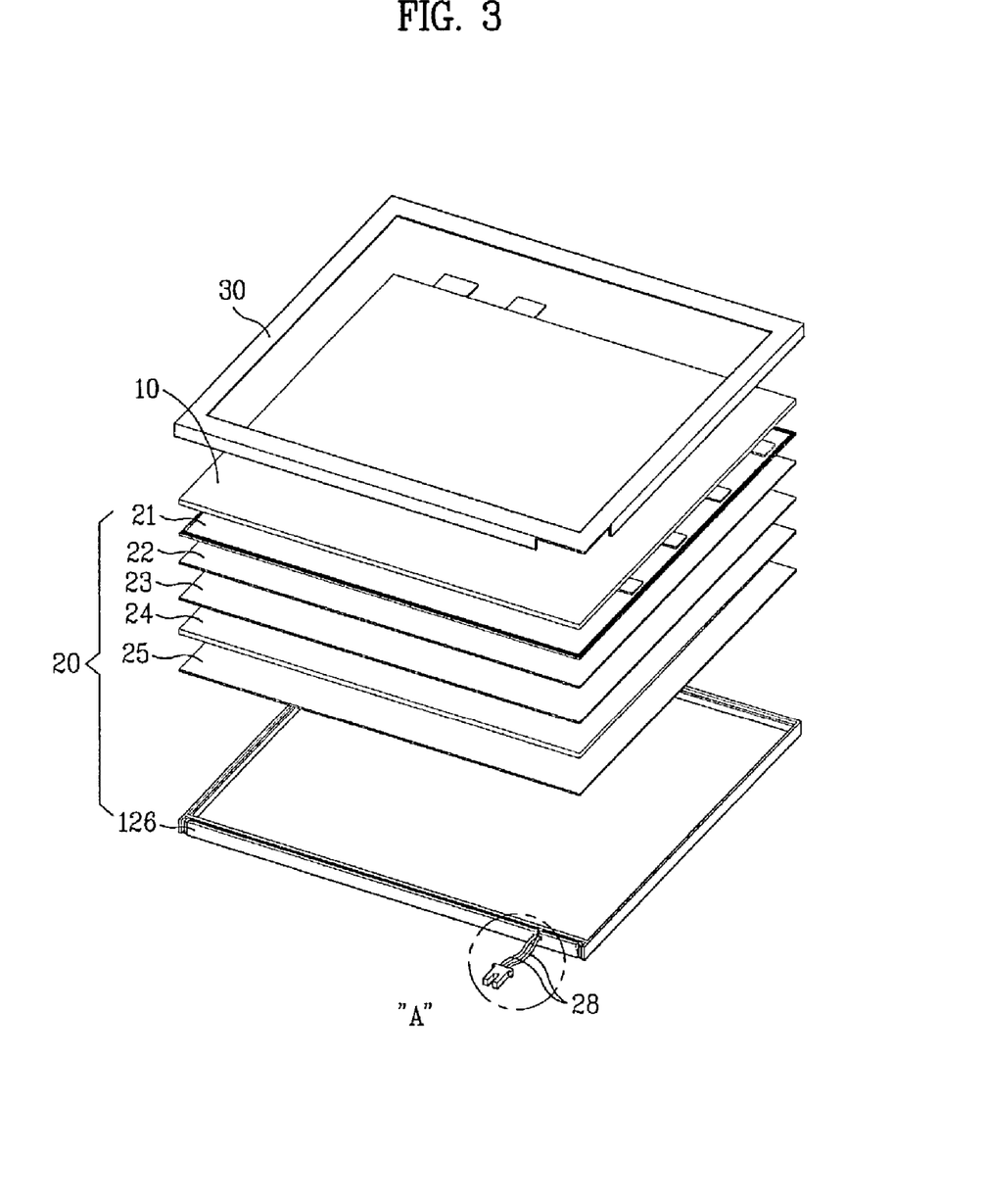
FIG. 3 is an exploded perspective view illustrating an LCD module for a portable computer having a structure for assembling lamp wires into an LCD module according to the first embodiment of the present invention.
Figure 4:
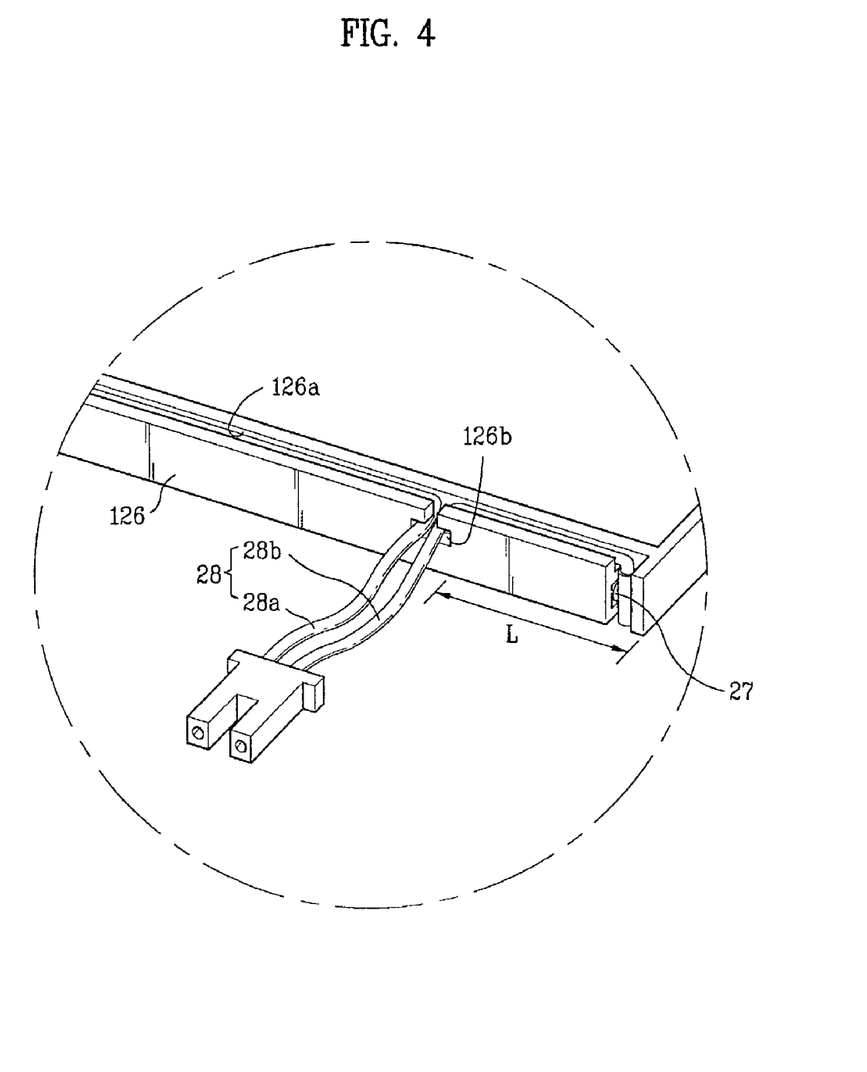
FIG. 4 is a partially enlarged view illustrating portion "A" of FIG. 3.

FIG. 3 and FIG. 4 are views illustrating an LCD module used as a display device of a portable computer, referred as a notebook computer or a laptop, having a structure for assembling lamp wires into an LCD module according to the first embodiment of the present invention.

As shown in FIG. 3 and FIG. 4, the LCD module according to the first embodiment of the present invention includes a liquid crystal panel 10, a backlight assembly 20, and a metal chassis 30.

At this time, the liquid crystal panel 10 is formed at the front of the LCD module to output an image, and the backlight assembly 20 is formed at the rear of the liquid crystal panel 10 to provide light to the liquid crystal panel 10. Also, the metal chassis 30 of a rectangular frame fixes and supports the liquid crystal panel 10 and the backlight assembly 20.

The backlight assembly 20 includes a plurality of diffusion sheets 21, a plurality of prism sheets 22 and 23, a light-guiding plate 24, a reflecting sheet 25, and a mold frame 126. The mold frame 126 of the rectangular frame is provided with a lamp 27 mounted along one side of the mold frame and is formed of plastic.

In order to provide a power to the lamp, wires 28a, 28b are respectively connected to both sides of the lamp 27. The lamp may be automatically operated.

An opening 126b is formed at one corner of the side of the mold frame 126. The wires 28 connected to the both ends of the lamp 27 pass through the opening 126b and are extracted to the outside of the LCD module through the opening 126b. A receiving groove 126a is formed at the edge of the mold frame 126 to lead the wires 28 to the opening 126b.

The opening 126b is formed at a location slightly spaced from the corner of the mold frame 126 by a predetermined distance 'L'. As shown in FIG. 4, each wire 28 is bent where the wire is extracted to the outside of the LCD module through the opening of the mold frame 126 and is connected to the end of the lamp. Each wire 28 may be bent two times at different portions.

Accordingly, during mounting the lamp 27 and the wires 28 to the mold frame 126 or using the LCD module, even though tension is applied to the wires 28, the tension is not transmitted to a junction between the lamp 27 and the wire 28 because support is generated in the bent portions of the wire.

Even though the tension is transmitted to the junction of the lamp and wire, it is possible to prevent the wire from being disconnected because the tensile force is weakened.

A method for mounting the lamp wire having the aforementioned structure to the mold frame will be explained in detail.

At first, the lamp 27 is mounted at one side of the mold frame 126, and the wires 28 connected to both ends of the lamp 27 are positioned along the receiving groove 126a at the side of the mold frame 126. Then, the wires 28 are inserted to the opening 126b, and are extracted to the outside of the LCD module through the opening 126b.

As mentioned above, the opening 126b is positioned at the location slightly spaced from the corner of the mold frame 126 so that each wire is folded two times at the two different portions. In this respect, even though the tension is applied to the wires 28b during mounting the wires 28 to the mold frame 126, it is possible to prevent the wires from being disconnected.

FIG. 5 to FIG. 8 are views illustrating a structure for assembling lamp wires into an LCD module according to the second embodiment of the present invention.

As shown in FIG. 5 to FIG. 8, wires 28a and 28b are connected at one portion by a connector 229 that is detachable from a mold frame 226, so that the wires 28 are stably mounted in the mold frame 226.

Figure 5:
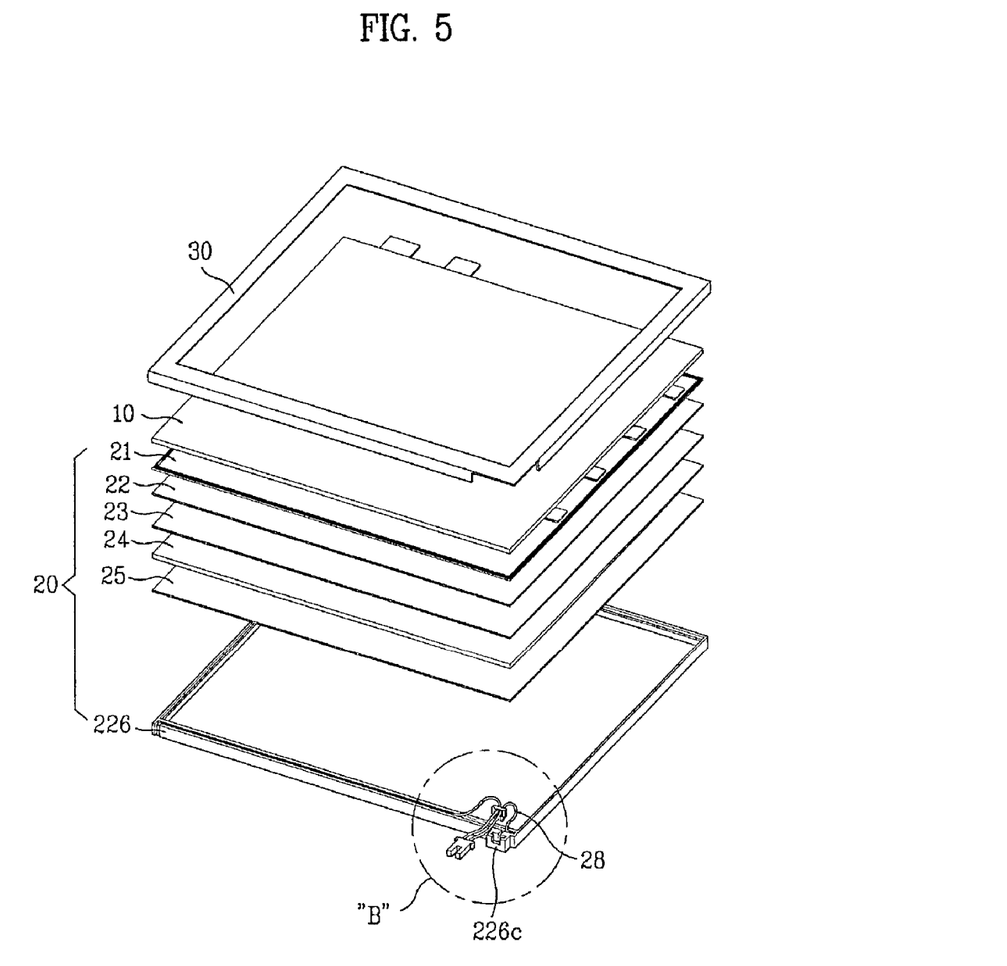
FIG. 5 is an exploded perspective view illustrating an LCD module for a portable computer having a structure for assembling lamp wires into an LCD module according to the second embodiment of the present invention.
Figure 6:
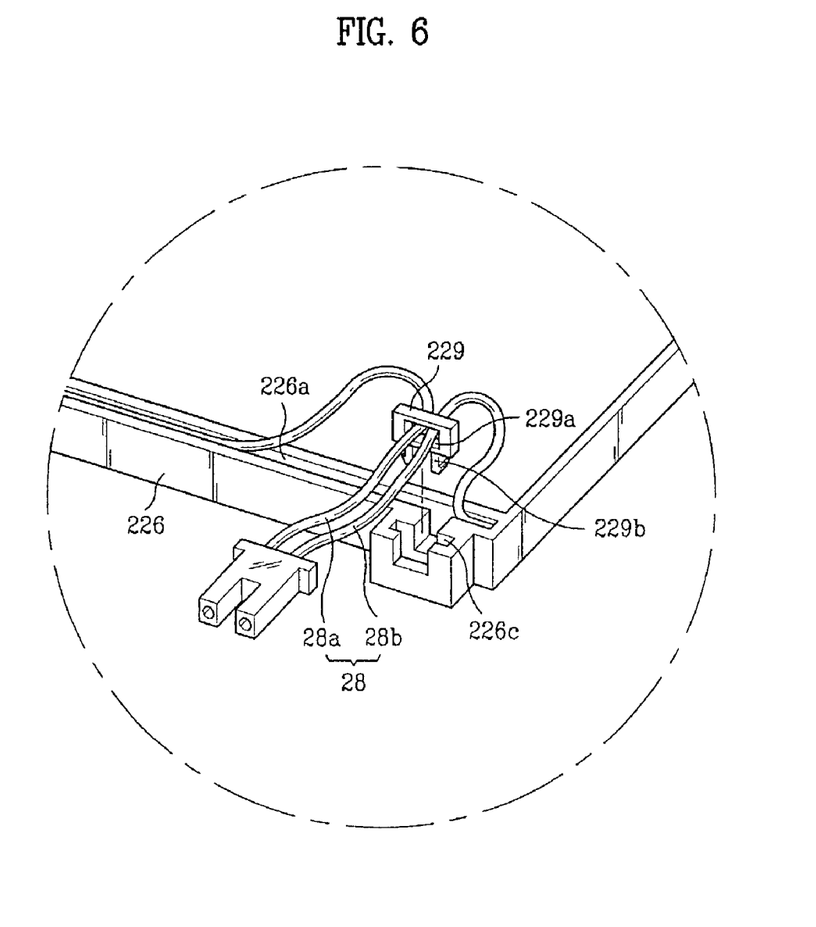
FIG. 6 is a partially enlarged view illustrating portion "B" of FIG. 5.
Figure 7:
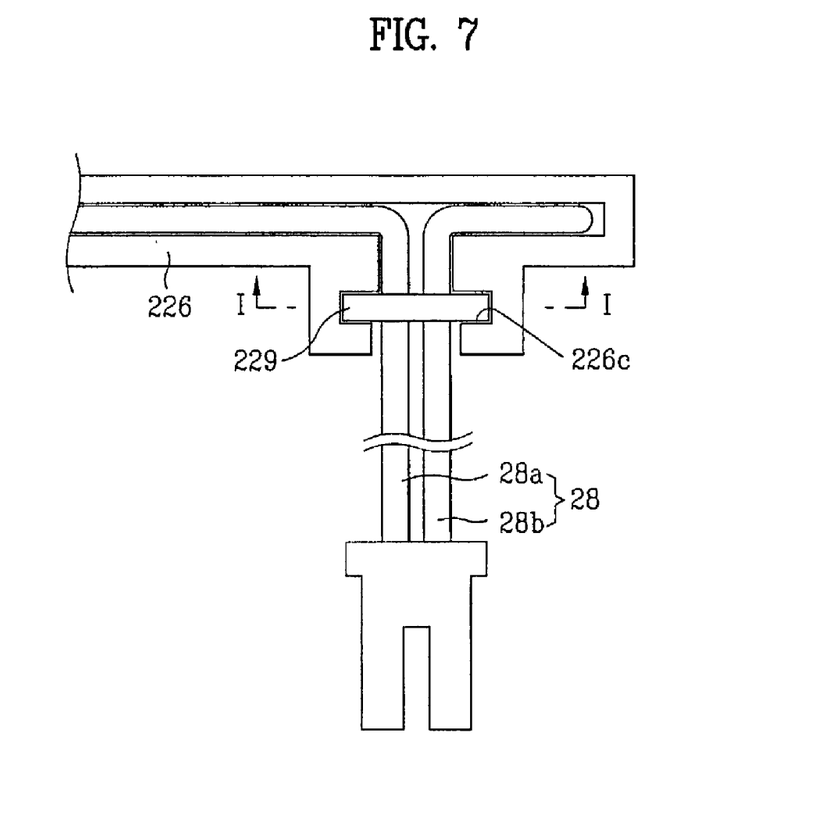
FIG. 7 is a plan view showing a state of connecting a connector of lamp wires to an inserting recess of an opening shown in FIG. 5.

An inserting recess 226c for extracting the wires through an opening is formed in the mold frame 226 at one corner of the mold frame near where the lamp 27 is mounted. The inserting recess 226c may be integral to the mold frame 226.

The wires 28 connected to both ends of the lamp 27 are connected at the portion by the connector 229, and the connector 229 is detachably inserted to the inserting recess 226c of the mold frame 226. Accordingly, the wires 28 connected to the both ends of the lamp 27 are stably extracted to the outside of an LCD module through an opening of the mold frame 226.

At this time, the inserting recess 226c may be formed at the corner of the mold frame 226. Preferably, the inserting recess 226c is formed at a location slightly apart from the corner of the mold frame 226.

Figure 8:
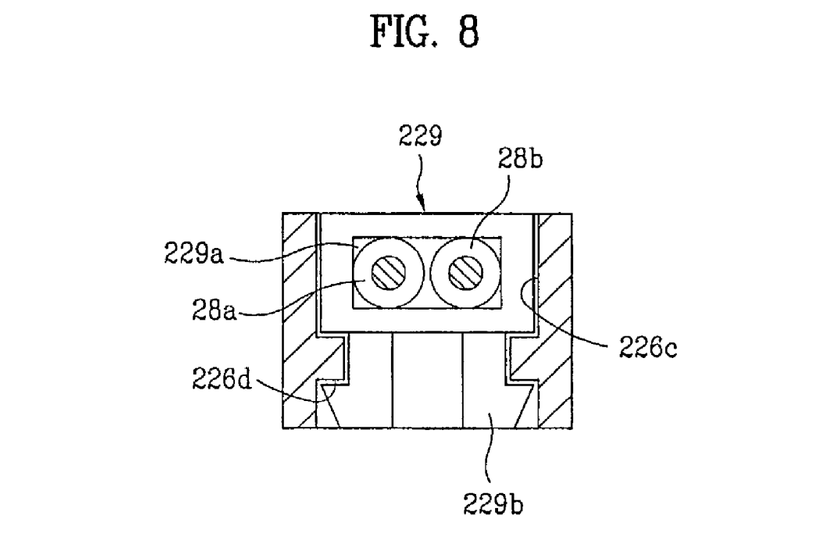
FIG. 8 is a sectional view of an LCD module taken along line I-I of FIG. 7.

Also, the front, rear and top surfaces of the inserting recess 226c are opened for extracting the wires and inserting the connector 229. As shown in FIG. 8, a projection 226d is formed at the bottom surface of the inserting recess 226c for being detachably connected to the connector 229.

Meanwhile, the connector 229 is provided with a body 229a for being penetrated by the wires 28 and a hook 229b projecting from the bottom surface of the body 229a. The body 229a of the connector 229 is inserted to the opened top surface of the inserting recess 226c, and then the hook 229b of the connector 229 is elastically connected with the projection 226d of the inserting recess 226c.

As explained above, the connector is inserted to the inserting recess 226c in a state that the wires 28 are connected at one portion by the connector 229, so that the wires 28 are stably mounted in the mold frame 226. Accordingly, it is possible to prevent the wires from coming out of the opening where the wires are extracted to the outside of the LCD module. Also, when a metal chassis is mounted in the mold frame in a state that the wires 28 are mounted in the mold frame 226, it is possible to safely protect the wires from the sharp edge of the metal chassis.

Figure 9:
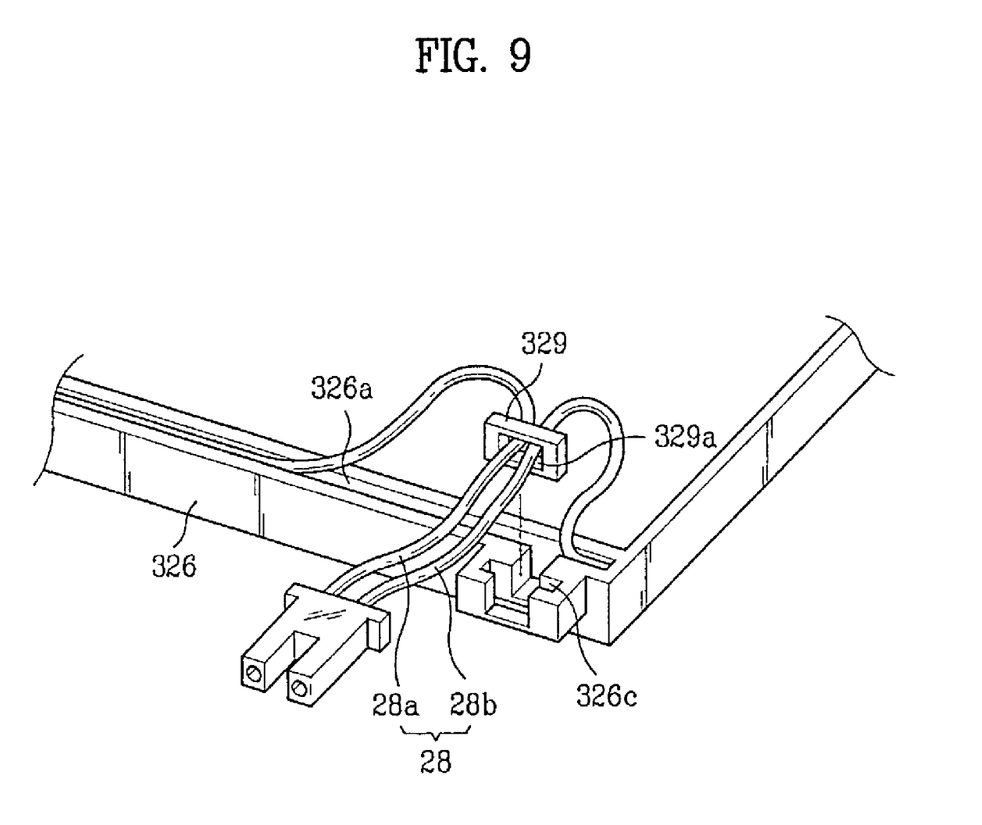
FIG. 9 is a view illustrating a structure for assembling lamp wires into an LCD module according to the third embodiment of the present invention, which is similar to FIG. 6.
Figure 10:
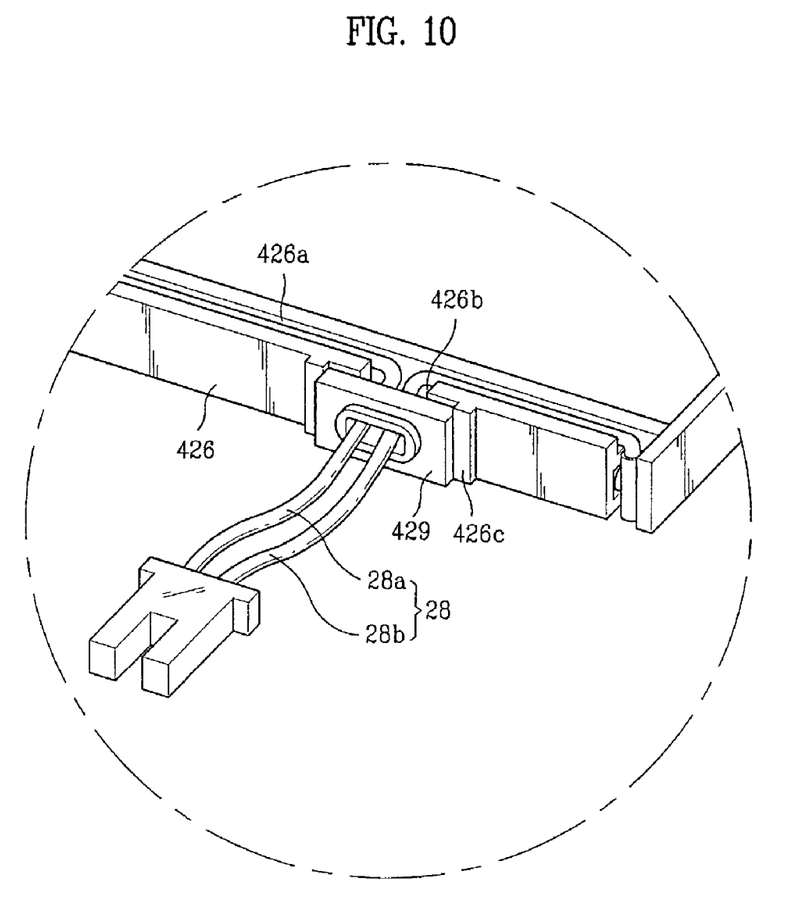
FIG. 10 is a perspective view illustrating a structure for assembling lamp wires into an LCD module according to the fourth embodiment of the present invention.
Figure 11:
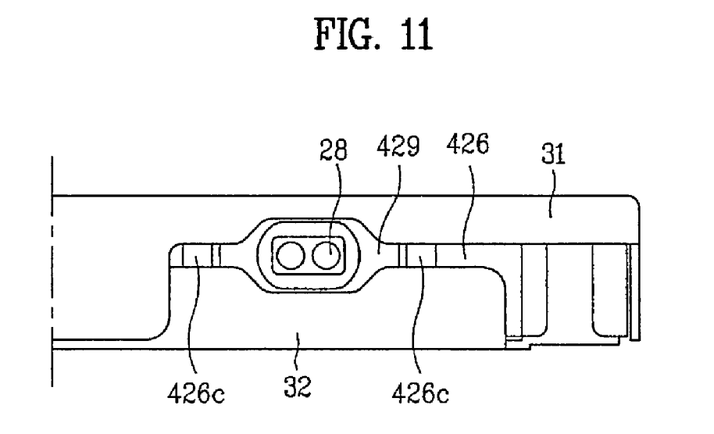
FIG. 11 is a front view illustrating a structure for assembling lamp wires of FIG. 10.
Figure 12:
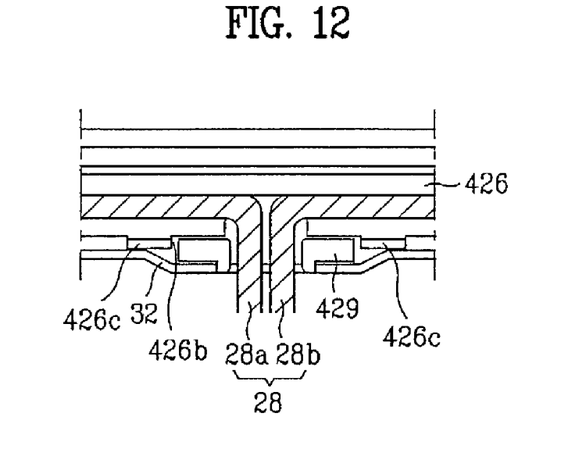
FIG. 12 is a transverse sectional view illustrating a structure for assembling lamp wires of FIG. 10.
Figure 13:
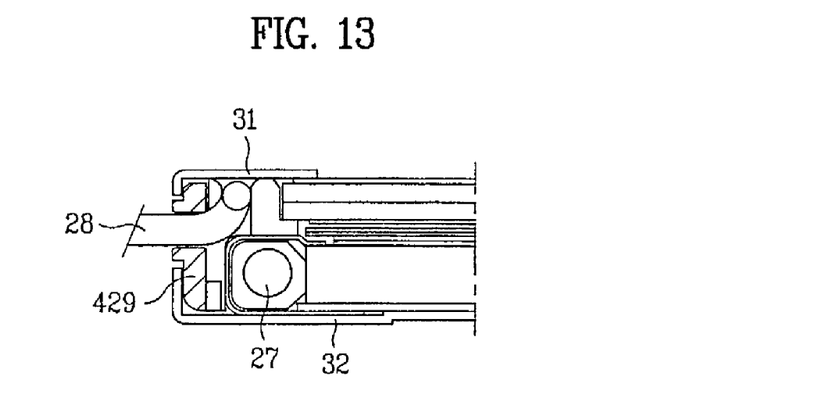
FIG. 13 is a longitudinal sectional view illustrating a structure for assembling lamp wires of FIG. 10.

In the aforementioned embodiment, the connector 229 is stably connected to the inserting recess 226c by the connection of the hook 229b and the projection 226d. However, in the third embodiment of the present invention as shown in FIG. 9, a connector 329 connected to the wires 28 may be simply inserted to an inserting recess 326c in a fit system. At this time, if the size of the connector 329 is exactly the same as the inserting recess 326c, it is difficult to fit the connector 329 to the inserting recess 326c. Meanwhile, if the size of the connector 329 is smaller than the inserting recess 326c, the connector 329 is easily separated from the inserting recess 326c. Accordingly, it is necessary to fabricate the connector 329 and the inserting recess 326c in appropriate sizes to stably connect the connector 329 to the inserting recess 326c. The connector 329a, the mold frame 326 forming the inserting recess 326c, or both may be made of a material having elasticity to be slightly deformable to fit the connector 329a snugly.

FIG. 10 to FIG. 13 are views illustrating a structure for assembling lamp wires into an LCD module according to the fourth embodiment of the present invention.

As shown in FIG. 10 to FIG. 13, wires 28 are inserted to a connector 429, and the connector 429 is positioned at an inserting recess 426b having an opened front surface. At this time, the connector 429 is supported with additional lower and upper metal chassis 31 and 32.

Also, two supporting projections 426c are formed in one body of the mold frame 426 to form the inserting recess 426b wider than the connector 429. Then, the connector 429 connecting the wires 28 is inserted from the top to a space formed with the two supporting projections 426c of the mold frame 426 and the lower metal chassis 32, and then the top surface of the connector 429 is supported with the upper metal chassis 31.

In the fourth embodiment of the present invention, additional devices for supporting the connector 429 are not formed in the mold frame 426, and the lower and upper metal chassis 32 and 31 support the connector 429. Accordingly, the lamp wires can be safely and stably mounted in the mold frame without increasing the size of the LCD module.

The structure for assembling the lamp wires into an LCD module according to the present invention has the following advantages.

In the structure for assembling the lamp wire for the backlight assembly into the LCD module according to one embodiment of the present invention, the wires are folded or bent several times at different portions and are extracted to the outside of the LCD module. In this respect, even though tension is applied to the wires, the tension is not transmitted to the junction between the lamp and the wire. Accordingly, it is possible to prevent the wires from being disconnected and to prevent the lamp from being damaged, thereby improving reliability of the device.

In another embodiment of the present invention, the lamp wires are connected at one portion by the connector, and the connector is stably connected to one corner of the mold frame so that the wires are stably mounted in the mold frame without coming out of the opening of the mold frame, thereby preventing the wires from being disconnected during fabricating.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A structure for assembling lamp wires for a backlight assembly into an LCD module, the LCD module including a liquid crystal panel and a mold frame having a lamp as a light source for emitting light to the liquid crystal panel, wherein the mold frame includes an opening formed at one portion slightly apart from one corner by a predetermined distance and an inserting recess, the structure further comprising a connector for inserting and supporting wires connected to both ends of the lamp, the wires being extracted to the outside of the LCD module through the opening wherein the wires are folded several times, wherein the connector is inserted into the inserting recess.

2. A structure for assembling lamp wires for a backlight assembly into an LCD module, the LCD module including a liquid crystal panel and a backlight assembly as a light source for emitting light to the liquid crystal panel at the rear of the liquid crystal panel, the backlight assembly including a plurality of diffusion and prism sheets, a light-guiding plate, a rectangular mold frame supporting the elements, a lamp mounted at one corner of the mold frame, and lamp wires connected to both ends of the lamp to provide external power, wherein a connector is penetrated by the wire, an inserting recess is formed at the edge of the mold frame, and the connector is detachably inserted into the inserting recess, so that the wires are stably fixed in the mold frame.

3. The structure as claimed in claim 2, wherein the inserting recess is formed at a portion slightly apart from one corner of the mold frame by a predetermined distance.

4. The structure as claimed in claim 2, wherein the connector is inserted to the inserting recess in a fit system.

5. The structure as claimed in claim 2, wherein a first engaging portion is formed within the inserting recess of the mold frame, and a second engaging portion corresponding to the first engaging portion is formed in the connector for being detachably connected with the first engaging portion.

6. The structure as claimed in claim 5, wherein the first engaging portion of the inserting recess is formed in a shape of a projection protruding from the bottom surface of the connector, and the second engaging portion of the connector is formed in a shape of a hook for being elastically connected to the projection.

7. In a structure for assembling lamp wires for a backlight assembly into an LCD module, the LCD module including a liquid crystal panel, and a backlight assembly as a light source for emitting light to the liquid crystal panel, the backlight assembly including a plurality of diffusion and prism sheets, a light-guiding plate, a reflecting sheet, a rectangular mold frame for supporting the elements, a lamp mounted at an inner side of the mold frame for emitting light, and a lamp wire connected to both ends of the lamp to provide power, the structure comprising:

a connector for being penetrated by the lamp wire;

two supporting projections projecting from edges of the mold frame, which is wider than the connector;

a lower chassis connected to a lower part of the mold frame and forming a space, to which the connector is inserted, with the two supporting projections; and an upper chassis connected to an upper part of the connector to support the connector when the connector is inserted into the space formed by the two supporting projections and the lower chassis.

* * * * *